US008402043B2

(12) United States Patent
Chakra et al.

(10) Patent No.: US 8,402,043 B2
(45) Date of Patent: *Mar. 19, 2013

(54) ANALYTICS OF HISTORICAL CONVERSATIONS IN RELATION TO PRESENT COMMUNICATION

(75) Inventors: Al Chakra, Apex, NC (US); Gary Denner, Longwood (IE); Mette Hammer, Dublin (IE); George Kyriacou, Dublin (IE); Garret M. O'Keeffe, Dublin (IE); Patrick J. O'Sullivan, Ballsbridge (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/552,710

(22) Filed: Jul. 19, 2012

(65) Prior Publication Data

US 2012/0284353 A1    Nov. 8, 2012

Related U.S. Application Data

(63) Continuation of application No. 12/831,452, filed on Jul. 7, 2010.

(51) Int. Cl.
*G06F 15/16* (2006.01)
*G06F 17/30* (2006.01)

(52) U.S. Cl. ...................... 707/758; 709/204

(58) Field of Classification Search .................. 709/204; 707/751, 758
See application file for complete search history.

(56) References Cited

U.S. PATENT DOCUMENTS

| 6,546,390 | B1 | 4/2003 | Pollack et al. |
| 6,745,178 | B1 | 6/2004 | Emens et al. |
| 7,571,212 | B2 | 8/2009 | Reynolds et al. |
| 7,747,719 | B1 | 6/2010 | Horvitz et al. |
| 2003/0014395 | A1 | 1/2003 | Ruvolo et al. |
| 2004/0249650 | A1 | 12/2004 | Freedman |
| 2007/0005754 | A1 | 1/2007 | Horvitz et al. |
| 2008/0114737 | A1 | 5/2008 | Neely et al. |
| 2008/0189367 | A1 | 8/2008 | Okumura |
| 2008/0307489 | A1 | 12/2008 | Hubbard |

(Continued)

FOREIGN PATENT DOCUMENTS

EP    2073517 A1    6/2009

OTHER PUBLICATIONS

International Application PCT/EP2011/061122, International Search Report, Feb. 2, 2012.
Dyke, et al., "Butterfly: A Conversation-Finding Agent for Internet Relay Chat," Proc. of 4th Int'l. Conf. on Intelligent User Interfaces, IUI '99, 1999, ACM, pp. 39-41.
Thibodeau, et al., "White Rabbit—Matchmaking of User Profiles Based on Discussion Analysis Using Intelligent Agents," 5th Int'l. Conf. Intelligent Tutoring Systems ITS'2000, vol. 1839 of Lectures Notes of Computer Science, 2000, Springer-Verlag, Berlin Heidelberg, 2000, pp. 113-122.

*Primary Examiner* — Jorge A Casanova
(74) *Attorney, Agent, or Firm* — Cuenot, Forsythe & Kim, LLC (57) ABSTRACT

A method of analyzing historical communications. During a first communication session between a first user and at least a second user, at least a first communication exchanged between the first user and the second user can be detected and stored. A second communication exchanged in a second communication can be compared with the first communication to determine a degree of similarity between the first communication and the second communication. In one aspect, when the degree of similarity is at least a threshold value, an indication can be provided to at least one user participating in the second communication session that the first communication potentially is relevant to the second communication session and that the first communication is available to be reviewed. In another aspect, a report pertaining to hierarchical relationships between users and the context of the communications can be generated based on the first and second communications.

12 Claims, 5 Drawing Sheets

U.S. PATENT DOCUMENTS

| | | |
|---|---|---|
| 2009/0094288 A1 | 4/2009 | Berry et al. |
| 2009/0132632 A1 | 5/2009 | Jackson et al. |
| 2009/0292784 A1 | 11/2009 | Leedberg et al. |
| 2010/0058202 A1 | 3/2010 | Rostom |
| 2010/0223341 A1 | 9/2010 | Manolescu et al. |
| 2010/0241749 A1 | 9/2010 | Rasmussen et al. |
| 2010/0257457 A1 | 10/2010 | De Goes |
| 2011/0185025 A1 | 7/2011 | Cherukuri et al. |

During a first communication session between at least two users, detect a first communication exchanged between the users
502

↓

Generate a first set of analytics corresponding to the first communication, and associate the first set of analytics with the first communication
504

↓

Store the first communication and first set of analytics
506

During a second communication session between at least two users, detect a second communication exchanged between the users
602

↓

Generate a second set of analytics corresponding to the second communication, and associate the analytics with the second communication
604

↓

Store the second communication and second set of analytics
606

↓

Compare the second set of analytics to the first set of analytics to determine a degree of correlation between the first and second communications
608

↓

When the degree of similarity is at least a threshold value, indicate to at least one user participating in the second communication session that the first communication potentially is relevant to the second communication session and that the first communication is available to be reviewed
610

↓

Receive a user selection to view the first communication
612

↓

Present the first communication to at least one user participating in the second communication session
614

ANALYTICS OF HISTORICAL CONVERSATIONS IN RELATION TO PRESENT COMMUNICATION

CROSS-REFERENCE TO RELATED APPLICATIONS

This application is a Continuation of U.S. application Ser. No. 12/831,452, filed on Jul. 7, 2010, the entirety of which is incorporated herein by reference.

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The embodiments disclosed within this specification relate to electronic messaging systems. More particularly, the embodiments relate to providing analytics of historical conversations in relation to a present communication.

Instant messaging (IM) frequently is used in corporate environments as an efficient means of communication. Without any overt action by one of the users participating in an IM session to save the IM messages (e.g., selecting a print screen key on a keyboard), correspondence exchanged in the IM session typically is not permanently stored in a manner which allows the correspondence to be reviewed at a later time. Thus, IM users oftentimes must rely on their own memory to recall information exchanged in an IM session. Human memory is not infallible, and certain details of messages exchanged in an IM session may be lost.

BRIEF SUMMARY OF THE INVENTION

The embodiments disclosed within this specification relate to electronic messaging systems. More particularly, the embodiments relate to providing analytics of historical conversations in relation to a present communication.

One embodiment of the present invention can include a method of analyzing historical communications in relation to a present communication. The method can include, during a first communication session between a first user and at least a second user, via a first processor, detecting at least a first communication exchanged between the first user and the second user, and storing the first communication to a computer readable storage medium. The method also can include, during a second communication session, via the first processor or a second processor, comparing a second communication exchanged in the second communication session with the first communication to determine a degree of similarity between the first communication and the second communication. When the degree of similarity is at least a threshold value, an indication can be presented to at least one user participating in the second communication session that the first communication potentially is relevant to the second communication session and that the first communication is available to be reviewed.

Another embodiment of the present invention can include a method of analyzing historical communications. The method can include, during a first communication session between a first user and at least a second user, with a first processor detecting at least a first communication exchanged between the first user and the second user, generating a first set of analytics corresponding to the first communication and associating the first set of analytics with the first communication, and storing the first communication and the first set of analytics to a computer readable storage medium. The method also can include, during a second communication session between a first user and a third user, with the first processor or a second processor detecting at least a second communication exchanged between the first user and the third user, generating a second set of analytics corresponding to the second communication and associating the second set of analytics with the second communication, and storing the second communication and the second set of analytics to a computer readable storage medium. Based on the first set of analytics and the second set of analytics, a report can be generated. The report can pertain to hierarchical relationships between the first user, the second user and the third user, and pertain to the context of the first and second communications.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk drive, a solid state drive, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Aspects of the present invention relate to analyzing information pertaining to communications exchanged during a communication session and generating analytics based upon this information. The analytics, as well as the communications, can be stored for future retrieval. The communications can be retrieved, for example, when the analytics of the communications indicate a correspondence to communications exchanged in a present communication session.

For instance, if the context of a communication exchanged in a present communication session correspond to the context of a previously stored communication, an indicator can be presented to one or more of the users participating in the current communication to indicate that the previously stored communication is relevant to the present communication session. The context can pertain to terms, phrases, content and/or other information, users participating in the present communication session, locations of users participating in the present communication, social relationships among the users, and/or the like. In response to the indicator being presented, one or more users in the present communication session can selectively choose to have the previous communication presented for perusal by the user(s). Other related communications also can be presented.

The stored communications also can be analyzed to generate reports pertaining to the communications. Such reports can identify contextual information, location attributes, hierarchical relationships, etc. As will be described, the hierarchical relationships can pertain to relationships among users, relationships among subject matter discussed in the communications, and the like.

Figure 1:
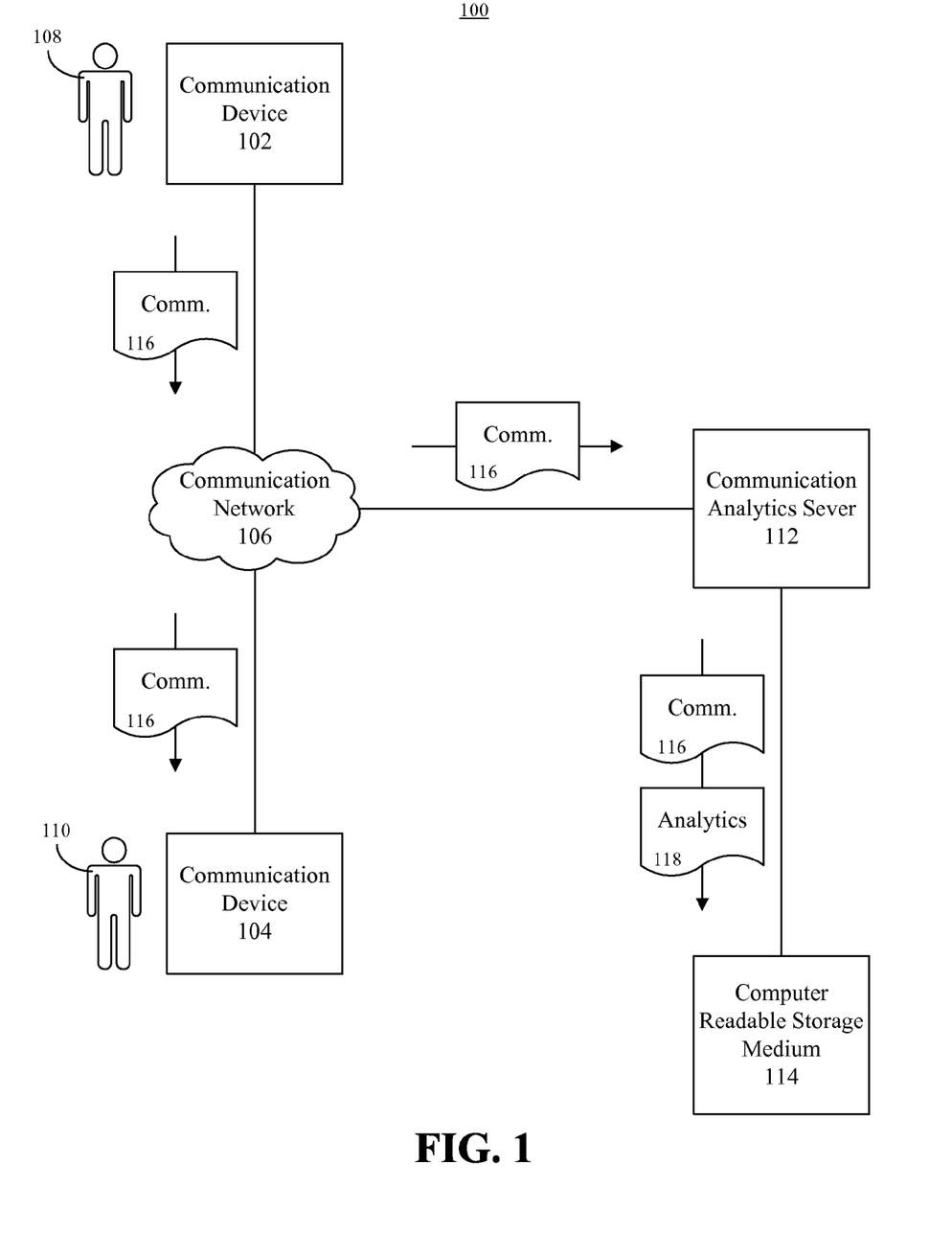
FIG. 1 is a block diagram illustrating a system for analyzing historical conversations in relation to a present communication in accordance with one embodiment of the present invention.

FIG. 1 is a block diagram illustrating a system 100 for analyzing historical conversations in relation to a present communication, in accordance with one embodiment of the present invention. In one aspect of the invention, the system 100 can include a plurality of communication devices, for example communication devices 102, 104, which are communicatively linked to one another via a communication network 106.

The communication devices 102, 104 can be any devices used by users 108, 110 to communicate with one another. As used herein, a user is a person. A communication device 102, 104 can be telephone, a mobile telephone, a videophone, or a personal digital assistant. In other embodiments, a communication device 102, 104 can be a device that supports video conferencing, instant messaging (e.g., text messaging), e-mail communications, etc. In this regard, a communication device 102, 104 can be a computing device having a suitable communication application instantiated thereon. Examples of such a computing device can include, but are note limited to, a computer (e.g., a workstation, a personal computer, a mobile computer, etc.), a tablet computer, and the like.

The communication network 106 can be any form of communication network that communicatively links the communication devices 102, 104 to one another and that supports communications among the communication devices 102, 104. In this regard, the communication network 106 can support voice communications, video communications and/or text communications (e.g., instant messaging and e-mail communications). The communication network 106 can comprise the Internet, a wide area network (WAN), a local area network (LAN), a mobile communications network (e.g., a cellular communications network), or any other systems through which voice, video and/or text based communications may be communicated.

The system 100 also can include a communication analytics server 112. In one arrangement, the communication analytics server 112 can be a device or system that is communicatively linked to the communication devices 102, 104 via the communication network 106. In another arrangement, the communication analytics server 112 can embodied within one or both of the communication devices 102, 104.

The system 100 further can include a computer readable storage medium (hereinafter "storage medium") 114. As noted, the storage medium 114 can include one or more physical memory devices such as, for example, local memory and one or more bulk storage devices. Local memory refers to random access memory or other non-persistent memory device(s) generally used during actual execution of the program code. Examples of a bulk storage device include a magnetic storage device (e.g., a hard disk drive, a tape drive, etc.), a solid state device (e.g., flash memory, a solid state drive, and the like), an optical storage device, a magneto-optical storage device or any other persistent data storage device. In one arrangement, the bulk storage devices can be contained within the communication analytics server 112. In another arrangement, the bulk storage devices can be contained on one or more other systems to which the communication analytics server 112 is communicatively linked.

In operation, the user 108 can send a communication 116 to the user 110. More particularly, the communication 116 can be sent from the communication device 102 to the communication device 104 via the communication network 106. As used herein, a communication can be a text communication (e.g., an instant message or e-mail), a voice communication (e.g. a verbal communication during a telephone call or teleconference, or a verbal communication during an in-person meeting or conference), a video communication, an audio/video communication, or the like.

The communication 116 also can be sent to the communication analytics server 112. The communication analytics server 112 can analyze the communication to generate analytics 118 for the communication 116. As used herein, analytics are analytical data pertaining to a communication. The analytics can include data pertaining to a user identifier corresponding the user 108, a user identifier corresponding the user 110, location information for the user 108 and/or location information for the user 110. The location information can include an internet protocol (IP) address, an e-mail address, a domain name, a blog address, a wiki address, or any other information that may be used to identify a location of a user. The analytics 118 also can include data pertaining to the context of the communication 116. For example, the analytics 118 can include keywords or phrases contained in the communication 116, a subject of the communication 116, or the like. In one embodiment, the analytics 118 can comprise metadata.

The communication analytics server 112 can store the communication 116 and the analytics 118 generated for the communication to the storage medium 114 in a manner in which the analytics 118 are associated with the communication 116. For example, the communication 116 and the analytics 118 can be stored to a suitable database. Additional communications may be exchanged between the users 108, 110. The communication analytics server 112 can generate analytics for such communications as well, and store such analytics and communications in a manner in which the analytics are associated with the respective communications.

Figure 2:
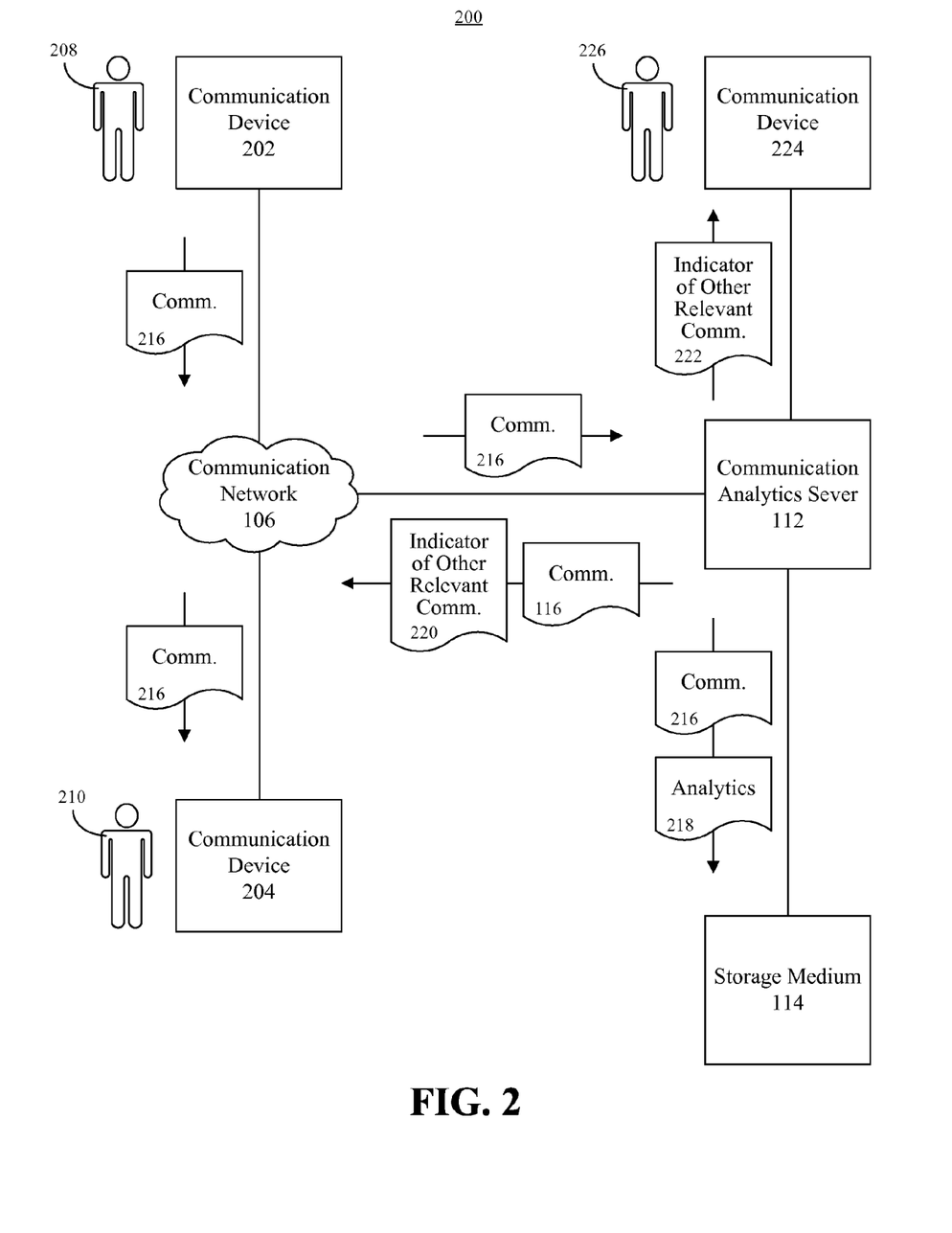
FIG. 2 is a block diagram illustrating a system for analyzing historical conversations in relation to a present communication in accordance with one embodiment of the present invention.

FIG. 2 is a block diagram illustrating the system 100 during additional operations, in accordance with one embodiment of the present invention. Referring to FIGS. 1 and 2, one or more of the users 208, 210 can be the same users 108, 110 depicted in FIG. 1, though this need not be the case. In this regard, the communication devices 202, 204 can the same communication devices 102, 104 depicted in FIG. 1, though this need not be the case. Indeed, one or both users 208, 210 can be different than the users 108, 110, and one or more of the communication devices 202, 204 can be different than the communication devices 102, 104.

During a subsequent communication session, the user 208 can send a communication 216 to the user 210. More particularly, the communication 216 can be sent from the communication device 202 to the communication device 204 via the communication network 106. The communication 216 also can be sent to the communication analytics server 112. The communication analytics server 112 can analyze the communication 216 to generate analytics 218 for the communication 216, and store the communication 216 and analytics 218 to the storage medium 114 in the manner previously described.

The communication analytics server 112 also can compare the analytics 218 to the analytics 118 generated for the previous communication 116 of FIG. 1 to determine a degree of similarity (e.g., correlation) between the communications 116, 216. The degree of similarity can be determined based on any number of suitable parameters, for example locations of the users 108, 110, 208, 210, user identifiers associated with the users 108, 110, 208, 210, context of the communications 116, 216, relationships among two or more of the users 108, 110, 208, 210, and so on.

In illustration, if terms and/or phrases in the communication 116 correspond to terms and/or phrases in the communication 216, a context match parameter can be assigned or generated. If a location associated with the user 108 corresponds to a location associated with the user 208, a location match parameter can be assigned or generated to indicate such correlation. Similarly, if a user identifier associated with the user 108 corresponds to a user identifier associated with the user 208, a user identifier match parameter can be assigned or generated to indicate such correlation. Moreover, if the user identifiers for the users 108, 208 indicate that the users 108, 208 have a hierarchical relationship, a hierarchical match parameter can be assigned or generated. Further, a hierarchical relationship can be identified, for example, if the users 108, 208 belong to the same social group, report to the same manager, work in the same company or division, work on the same project, have a manager/subordinate relationship, and so on.

In one aspect of the invention, one or more of the assigned or generated parameters can have a corresponding value. For instance, the context match parameter can be assigned a value based on the degree of similarity between the contexts of the communications 116, 216. The location match parameter can be assigned a value based on whether the respective locations match precisely, or are relatively close. For example, if the locations are determined by IP addresses, and the IP addresses are an exact match, a particular value can be assigned. If, however, the IP addresses are not an exact match, but the IP addresses belong to the same domain or subnet, a different value can be assigned. Further, the hierarchical match parameter can be assigned a value depending on the proximity of the users 108, 208 and/or their relationship within an institutional and/or social hierarchy.

In the preceding analytics examples, the users 108, 208 were referenced for illustration purposes. Nonetheless, the same concepts apply to the users 110, 210, the users 108, 210, the users 110, 208, and to any other users participating in the communication sessions.

Based on the parameters assigned or generated, and their respective values, a value for the degree of similarity between the communication 216 and the communication 116 can be assigned or generated. Of course, the number of communications that are analyzed and stored is not limited, and the communication 216 can be compared to any number of previous communications in the manner previously described. The value for the degree of similarly can be generated in real time, for example immediately when the communication analytics server 112 receives the communication 216. As used herein, the term "real time" means a level of processing responsiveness that a user or system senses as sufficiently immediate for a particular process or determination to be made, or that enables the processor to keep up with some external process.

If the communication analytics server 112 determines that the degree of similarity between the communication 216 and at least one previous communication, for example the communication 116, is at least a threshold value, then the communication analytics server 112 can indicate to the user 208 and/or the user 210 that the communication 116 is potentially relevant to the present communication session, and that the communication 116 is available to be reviewed. Such indication can be provided in real time. If the degree of similarity between the communication 216 and other communications also is at least a threshold value, then the indicator also can indicate that those communications are relevant to the present communication session and are available to be reviewed.

In illustration, the communication analytics server 112 can communicate an indicator 220 to the communication device 202 and/or the communication device 204 for presentation to the respective user(s) 208, 210. The indicator 220 can indicate that the communication 116 is potentially relevant to the present communication session, and that the communication 116 is available to be reviewed. The indicator 220 can be communicated via the communication network 106. The indicator 220 can trigger the communication device 202 and/or the communication device 204 to present to notification to the respective user(s) 208, 210. The notification can comprise a text message, an audio signal or message, a video signal or message, an icon, or any other type of notification that may be presented to the user(s) 208, 210. Other types of notifications can include, but are not limited to, a pop-up window, a change in color of a portion of a window, an icon change, and so on.

In response to the notification, the user 208 and/or user 210 can choose to listen to and/or view the communication 116. For example, the user 208 can select the notification using a cursor, select a menu item or icon, utter a particular phrase, or the like. In response, the communication analytics server 112 can send the communication 116 to the communication device 202 and/or the communication device 204 for presentation to the respective user(s) 208, 210. Optionally, the analytics 118 also can be sent for presentation.

In an arrangement in which the communication is presented textually, the communication 116 can be presented with visual indicators that identify relevant portions of the communication 116. For example, key words and/or phrases can be presented with effects that distinguish the key words and/or phrases from other text in the communication. For instance, the key words and/or phrases can be presented with highlighting applied, presented in a different font size, style, color and/or type, presented with underlining, italic and/or bold effects, etc.

In an arrangement in which the communication 116 is presented as audio, video or audio/video, relevant portion(s) of the communication 116 can be distinguished by applying audio and/or video effects to the relevant portion of the communication 116. In another aspect of the present invention, the relevant portion(s) of the communication 116 can be exclusively presented, and an option can be presented to the user(s) 208, 208 to selectively choose to listen to and/or view one or more other portions of the communication 116, or the entire communication 116.

In another aspect of the invention, the communication analytics server 112 also can identify another user 226 who is not participating in the second communication session, but who may have an interest in the communication 226. The communication analytics server 112 can send an indicator 222 to the user 226. For instance, the indicator 222 can be sent to a communication device 224 associated with the user 226. The indicator 222 can indicate that the communication 116 is potentially of interest to the user 226, and that the communication 116 is available to be reviewed. The indicator 222 can be communicated via the communication network 106, or via another suitable communication network.

For example, assume that the user 226 is the user 110 who originally received the communication 116, and that the user 226 and the user 210 are close to one another in a social and/or organizational network. If the analytics corresponding to the communication 216 have a degree of similarity with the analytics corresponding to the communication 116, the indicator 222 can alert the user 226 of the communication 216 being sent to the user 210. As noted, the analytics can be based on context, location, user identifiers, etc. The degree of similarity can be based on one or more of the parameters assigned or generated for the communications 116, 216, for example those parameters previously discussed. The user 226 can be provided an option to choose to view and/or listen to the communication 216, for example as previously discussed with respect the option presented to the user(s) 208, 210 to view the communication 116.

In another example, a request can be received from the user 226 to search the computer readable storage medium for previous communications. The request can include at least one search term. The search term can identify a location, context, a key words, a key phrase, or the like The computer readable storage medium can be searched based on the search term, and the first communication 116 can be identified. Based on the analytics associated with the respective first communication 116 and second communication 216, the second communication 216 can be identified. The first and second communications 116, 216 can be presented to the user 226 in response to the request.

In one arrangement, content in the communication 116 (or communication 216 if being presented to the user 226) can be filtered to prevent sensitive (e.g., confidential) information from being presented. For example, a portion of the communication 116, for example one or more words, phrases, sentences, paragraphs, etc., can be redacted prior to the communication 116 being sent for presentation to the user(s) 208, 210. Further, the determination as to whether to redact sensitive information can be based on a user identifier associated with the user 208 and/or a user identifier associated with the user 210. For instance, if a user profile for the user 208 indicates that the user 208 is authorized to view sensitive data, while a user profile for the user 210 indicates that the user 210 is not authorized to view sensitive data, an un-redacted version of the communication 116 can be sent to the communication device 202 for presentation to the user 208, while a redacted version of the communication 116 can be sent to the communication device 204 for presentation to the user 210.

The communication analytics server 112 can filter the communication 116 in any suitable manner. For example, the communication analytics server 112 can access a database containing sensitive terms and/or phrases, and identify those terms and/or phrases, or synonyms of such terms and/or phrases, within the communication 116. The communication analytics server 112 can apply redaction to the communication 116 based on such identification.

In another aspect of the invention, users 108, 110, 208, 210 can assign or generate parameters to be associated with the communication 116 as part of the analytics, for example after such users have sent, received and/or reviewed the communication 116. Referring to FIG. 1, if the user 110 receives a communication 116 that appears to have been generated with deceptive intent, the user 110 can assign a parameter, such as a flag, to the communication 116 that indicates that the communication 116 contains questionable content. This parameter can be recognized by the communication analytics server 112, which can process the communication 116 in accordance with the parameter.

For example, referring again to FIG. 2, if the communication analytics server 112 determines that the degree of similarity between the communication 216 the communication 116, the communication analytics server 112 can alert the user 210 that the communication 216 may have been generated with deceptive intent. The alert can be provided in any suitable manner, for example as previously described with respect to the notification that is presented to the user(s) 208, 210.

Other information can be generated for the communication 116 as well, regardless of whether the communication 116 was generated with apparently deceptive intent. For example, the user 110 can assign notes to the communication 116 which may be presented to other users 208, 210 who view the communication. Such notes can be added as text within the communication 116, metadata to be associated with the communication 116, audio and/or video information to be associated with the communication, or associated with the communication 116 in any other suitable manner.

In another aspect of the present invention, the analytics generated for the communications 116, 216, as well as other communications, can be processed to generate desired reports based on the communications. For example, reports can be generated based on attributes associated with locations from which the communications 116, 216 originate, attributes associated with locations to which the communications 116, 216 are sent, hierarchical relationships among users 108, 110, 208, 210, 226 sending, receiving, and viewing the communications 116, 216, and context of the communications 116, 216.

Such reports can be generated and or updated in real time, for example as new communications are generated, but this need not be the case. For example, reports can be generated for all communications 116, 216 that presently are stored on the storage medium 114. Moreover, queries can be used to filter the communications 116, 216 based on their associated analytics, and the reports can be generated for those communications 116, 216 selected through use of the queries.

Figure 3:
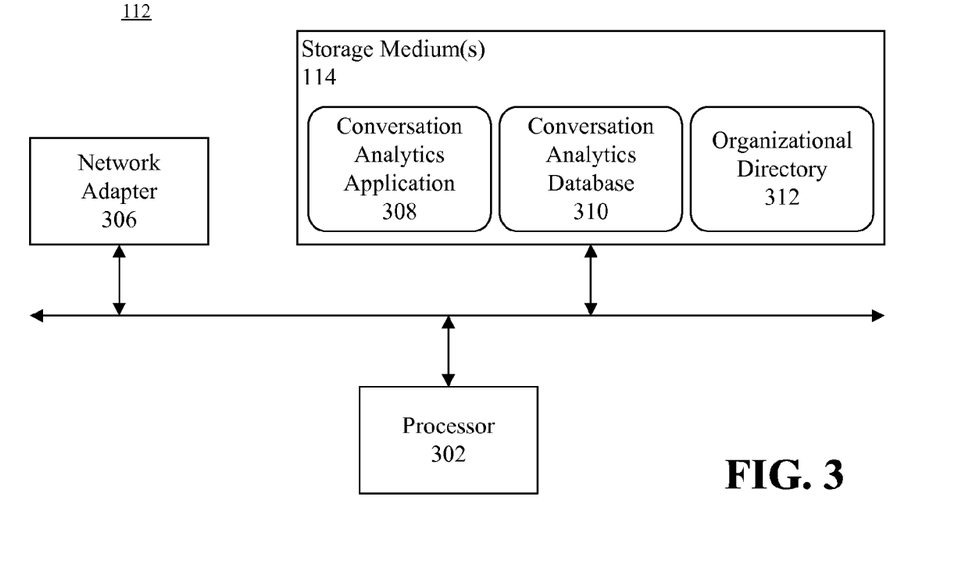
FIG. 3 is a block diagram of a communication analytics server in accordance with one embodiment of the present invention.

FIG. 3 depicts an example of the communication analytics server 112 in accordance with one embodiment of the present invention. The communication analytics server 112 can include at least one processor 302 coupled to at least one storage medium 114, for example through a system bus and/or a communication network. As such, the communication analytics server 112 can store program code within storage medium(s) 114. The processor 302 can execute the program code accessed from storage medium(s) 114 via the system bus. In aspect, for example, the communication analytics server 112 can be implemented as computer that is suitable for storing and/or executing program code. It should be appreciated, however, that communication analytics server 112 can be implemented in the form of any system comprising one or more processors and memory that is capable of performing the functions described within this specification. Moreover, the communication analytics server 112 can be distributed among one or more devices. For example, the communication analytics server 112 can be distributed among a server cluster or server devices located in different locations.

The communication analytics server 112 also can include one or more cache memories (not shown) that provide temporary storage of at least some program code in order to reduce the number of times program code must be retrieved from a bulk storage device during execution.

At least one network adapter 306 also can be coupled to the communication analytics server 112 to enable the communication analytics server 112 to become coupled to other systems, such as the communications devices, via the communication network. Modems, cable modems, and Ethernet cards are examples of different types of network adapters that can be used with the communication analytics server 112, but the present invention is not limited to these specific examples.

As pictured in FIG. 3, the storage medium(s) 114 can store a conversation analytics application 308, which may be implemented in the form of executable program code. The conversation analytics application 308 can be executed by the processor 302 and/or executed by another processor communicatively linked to the communication analytics server 112. The conversation analytics application 308 can be executed to implement the processes previously described with respect to FIGS. 1 and 2, and/or the processes subsequently described herein.

The storage medium(s) 114 also can store a conversation analytics database 310. The conversation analytics database 310 can serve to store the communications, their respective analytics, as well as any reports which may have been generated based on the communications and/or analytics. An organization directory 312 also can be stored on the storage medium(s) 114. The organizational directory 312 can be implemented as a hierarchical collection of objects associated with the organization, for example in accordance with the Lightweight Directory Access Protocol (LDAP). In this regard, the conversation analytics application 308 can be configured to access the organizational directory 312 in accordance with LDAP. The invention is not limited in this regard, however, and the organizational directory 312 can be implemented in any other suitable manner, for example in a database. In one aspect of the invention, the objects stored in the organizational directory 312 can be associated with users, user locations, categories of users, corporate infrastructure, and/or the like.

Figure 4:
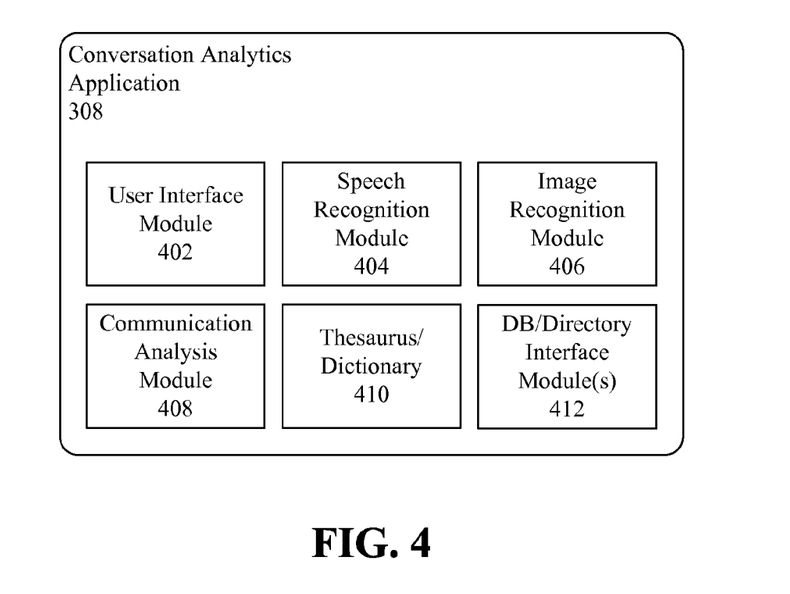
FIG. 4 is a block diagram of a conversation analytics application in accordance with one embodiment of the present invention.

FIG. 4 is a block diagram of the conversation analytics application 308 in accordance with one embodiment of the present invention. The conversation analytics application 308 can include a number of modules for carrying out various functionalities performed by the conversation analytics application 308, such as those previously described. For example, the conversation analytics application 308 can include a user interface module 402 which receives communications from the communication devices, sends communications to the communication devices, sends indicators to the communication devices, receives user selections from the communication devices, etc.

The conversation analytics application 308 also can include a speech recognition module 404 which performs speech recognition on audio content contained in the communications, and generates text information corresponding to the audio content. An image recognition module 406 can be provided to perform image recognition on images and/or video content contained in the communications. For example, the image recognition module 406 can perform optical character recognition on images, pdf documents, or the like, and generate corresponding text. The image recognition module 406 also can perform image recognition on images of users in order to automatically identify such users, and/or perform any other useful image recognition. Both speech recognition and image recognition are well know to those skilled in the art.

A communication analysis module 408 also may be provided to perform analysis on the communications and generate analytics, for example as previously described. A thesaurus and/or dictionary 410 can be provided to facilitate identification of terms and/or phrases, for example terms and/or phrases which are misspelled, identify synonyms contained in different communications, and the like. In one embodiment, the thesaurus and/or dictionary 410 can be customized to identify key terms and/or key phrases likely to be of relevance to users. The customization of the thesaurus and/or dictionary 410 can be performed manually and/or automatically using a suitable algorithm that identifies potentially relevant key words and/or phrases.

In addition, the conversation analytics application 308 can include a database/directory interface module 412 which enables the conversation analytics application 308 to store data to, and retrieve data from, the conversional analytics database and the organizational directory. The database/directory interface module 412 can implement suitable database and directory access protocols, for example, ASP, PHP, LDAP, and the like.

Figures 5, 6:
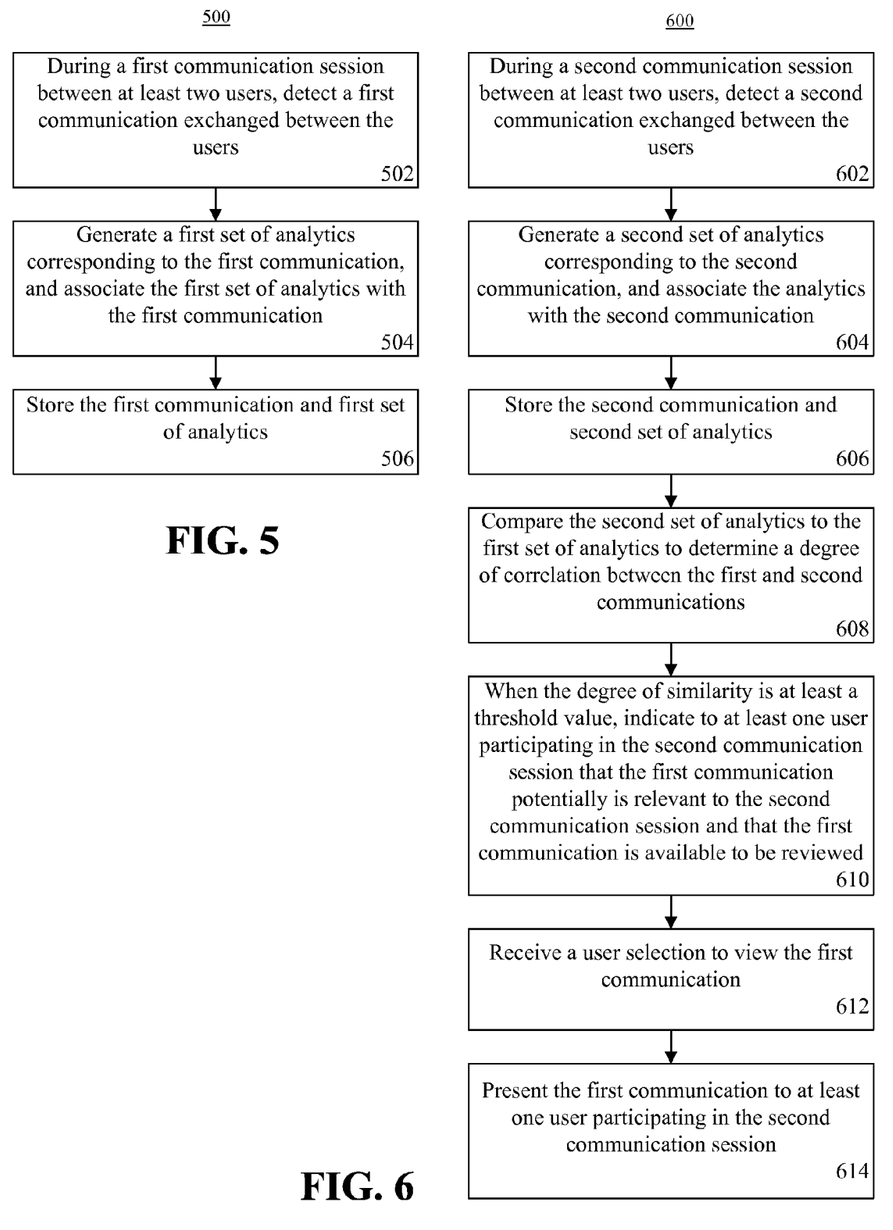
FIG. 5 is a flow chart illustrating a method of analyzing historical conversations in accordance with one embodiment of the present invention.
FIG. 6 is another flow chart illustrating a method of analyzing historical conversations in accordance with one embodiment of the present invention.

FIG. 5 is a flow chart illustrating a method 500 of analyzing historical conversations in accordance with one embodiment of the present invention. At step 502, during a first communication session between at least two users, a first communication exchanged between the users can be detected. At step 504, a first set of analytics corresponding to the first communication can be generated, and the first set of analytics can be associated with the first communication. At step 506, the first communication and first set of analytics can be stored to a storage medium.

FIG. 6 is another flow chart illustrating a method 600 of analyzing historical conversations in accordance with one embodiment of the present invention. At step 602, during a second communication session between at least two users, a second communication exchanged between the users can be detected. At least one of the users participating in the second communication can be a same user who participated in the first communication session, though this need not be the case.

At step 604, a second set of analytics corresponding to the second communication can be generated, and the second set of analytics can be associated with the second communication. At step 606, the second communication and second set of analytics can be stored to a storage medium.

At step 608, the second set of analytics can be compared to the first set of analytics to determine a degree of similarity between the first and second communications. At step 610, when the degree of similarity is at least a threshold value, an indication can be provided to at least one user participating in the second communication session that the first communication potentially is relevant to the second communication session and that the first communication is available to be reviewed.

At step 612, a user selection to view the first communication can be received. At step 614, the first communication can be presented to at least one user participating in the second communication session. For example, the first communication can be presented to the user who made the user selection, or a plurality of users participating in the second communication session.

Figure 7:
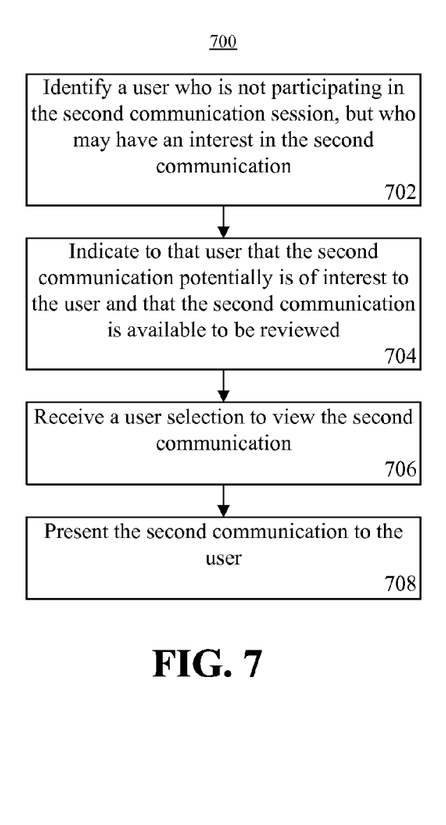
FIG. 7 is another flow chart illustrating a method of analyzing historical conversations in accordance with one embodiment of the present invention.

FIG. 7 is another flow chart illustrating a method 700 of analyzing historical conversations in accordance with one embodiment of the present invention. At step 702, a user who is not participating in the second communication session, but who may have an interest in the second communication, can be identified. At step 704, an indication can be provided to that user that the second communication potentially is of interest to the user and that the second communication is available to be reviewed.

At step 706, a user selection to view the second communication can be received. At step 708, the second communication can be presented to the user. In one arrangement, the analytics associated with the second communication also can be presented to the user.

Figure 8:
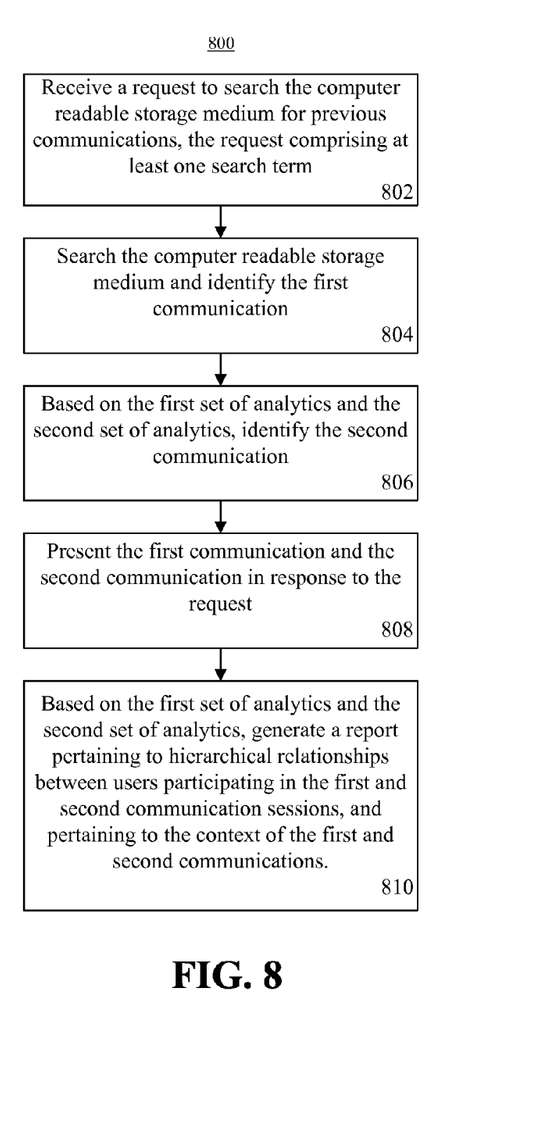
FIG. 8 is another flow chart illustrating a method of analyzing historical conversations in accordance with one embodiment of the present invention.

FIG. 8 is another flow chart illustrating a method 800 of analyzing historical conversations in accordance with one embodiment of the present invention. At step 802, a request can be received to search the computer readable storage medium for previous communications, the request comprising at least one search term. At step 804, the computer readable storage medium can be searched and the first communication can be identified. At step 806, based on the first set of analytics and the second set of analytics, the second communication can be identified.

Optionally, at step 808, the first communication and the second communication can be presented in response to the request. Optionally, at step 810, based on the first set of analytics and the second set of analytics, a report can be generated. The report can pertain to hierarchical relationships between users participating in the first and second communication sessions, and pertain to the context of the first and second communications. It should be noted that step 808 can be performed without need for performing step 810. Similarly, step 810 can be performed without need for performing step 808.

Like numbers have been used to refer to the same items throughout this specification, unless otherwise noted. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. Within a system comprising at least a first processor and a memory, a method of analyzing historical communications in relation to a present communication, the method comprising:
    during a first communication session between a first user and at least a second user, via the first processor:
    detecting at least a first communication exchanged between the first user and the second user; and
    storing the first communication to a computer readable storage medium; and during a second communication session, with the first processor or a second processor;
    comparing a second communication exchanged in the second communication session with the first communication to determine a degree of similarity between the first communication and the second communication; and
    when the degree of similarity is at least a threshold value, indicating to at least one user participating in the second communication session that the first communication potentially is relevant to the second communication session and that the first communication is available to be reviewed.

2. The method of claim 1, wherein:
    indicating to at least one user participating in the second communication session that the first communication potentially is relevant to the second communication session comprises presenting a user selectable message;
    the method further comprising:
    receiving a user selection to view the first communication; and
    in response to the user selection, presenting the first communication to at least one user participating in the second communication session.

3. The method of claim 2, further comprising:
    determining whether the first communication contains sensitive information; and
    when the first communication contains sensitive information, redacting the sensitive information from the first communication;
    wherein presenting the first communication comprises presenting the redacted first communication.

4. The method of claim 1, further comprising:
    generating a first set of analytics corresponding to the first communication;
    associating the first set of analytics with the first communication; and
    storing the first set of analytics to the computer readable storage medium.

5. The method of claim 4, further comprising:
    receiving a user input specifying contextual information relevant to the first communication;
    wherein generating the first set of analytics comprises generating analytics corresponding to the user input.

6. The method of claim 4, wherein the first set of analytics comprises contextual information corresponding to a content of the first communication.

7. The method of claim 4, wherein comparing the second communication exchanged in the second communication session with the first communication comprises:
    identifying contextual information contained in the second communication; and
    comparing the contextual information contained in the second communication to the first set of analytics.

8. The method of claim 4, further comprising:
    generating a second set of analytics corresponding to the second communication;
    associating the second set of analytics with the second communication; and
    storing the second set of analytics to the computer readable storage medium.

9. The method of claim 8, further comprising:
    identifying a third user who is not participating in the second communication session, but who may have an interest in the second communication;
    indicating to the third user that the second communication potentially is of interest to the third user and that the second communication is available to be reviewed;
    receiving a user selection from the third user to view the second communication; and
    presenting the second communication to the third user in response to the request.

10. The method of claim 8, further comprising:
    receiving a request to search the computer readable storage medium for previous communications, the request comprising at least one search term;
    searching the computer readable storage medium and identifying the first communication;
    based on the first set of analytics and the second set of analytics, identifying the second communication; and
    presenting the first communication and the second communication in response to the request.

11. Within a system comprising at least a first processor and a memory, a method of analyzing historical communications in relation to a present communication, the method comprising:
    during a first communication session between a first user and at least a second user, with the first processor:
    detecting at least a first communication exchanged between the first user and the second user;
    via the processor, determining at least a first identifier, the first identifier selected from a group consisting of a location identifier corresponding to at least one of the users participating in the first communication session and a user identifier corresponding to at least one of the users participating in the first communication session; and
    associating at least the first communication with the first identifier, and storing the first communication and the first identifier to a computer readable storage medium;
    during a second communication session, with the first processor or a second processor;
    determining at least a second identifier, the second identifier selected from a group consisting of a location identifier corresponding to at least one of the users participating in the second communication session and a user identifier corresponding to at least one of the users participating in the second communication session;
    identifying the first identifier based upon a correspondence of the first identifier with the second identifier;
    based upon the first identifier, selecting the first communication;
    comparing a second communication exchanged in the second communication session with the first communication to determine a degree of similarity between the first communication and the second communication; and
    when the degree of similarity is at least a threshold value, indicating to at least one user participating in the second communication session that the first communication potentially is relevant to the second communication session and that the first communication is available to be reviewed.

12. Within a system comprising at least a first processor and a memory, a method of analyzing historical communications, the method comprising:
    during a first communication session between a first user and at least a second user, with the first processor:
    detecting at least a first communication exchanged between the first user and the second user;
    generating a first set of analytics corresponding to the first communication and associating the first set of analytics with the first communication; and
    storing the first communication and the first set of analytics to a computer readable storage medium;
    during a second communication session between a first user and a third user, with the first processor or a second processor:
    detecting at least a second communication exchanged between the first user and the third user;
    generating a second set of analytics corresponding to the second communication and associating the second set of analytics with the second communication; and
    storing the second communication and the second set of analytics to a computer readable storage medium; and
    based on the first set of analytics and the second set of analytics, generating a report pertaining to hierarchical relationships between the first user, the second user and the third user, and pertaining to the context of the first and second communications.

\* \* \* \* \*